(12) United States Patent
Murray

(10) Patent No.: US 10,036,399 B2
(45) Date of Patent: Jul. 31, 2018

(54) MECHANICAL SEAL LUBRICATION SYSTEM

(71) Applicant: VP Sales and Company, LP, Alice, TX (US)

(72) Inventor: Patrick Murray, Alice, TX (US)

(*) Notice: Subject to any disclaimer, the term of this patent is extended or adjusted under 35 U.S.C. 154(b) by 386 days.

(21) Appl. No.: 14/833,661

(22) Filed: Aug. 24, 2015

(65) Prior Publication Data

US 2016/0061211 A1  Mar. 3, 2016

Related U.S. Application Data

(60) Provisional application No. 62/043,625, filed on Aug. 29, 2014.

(51) Int. Cl.
| | |
|---|---|
| *F04D 29/06* | (2006.01) |
| *F04D 29/12* | (2006.01) |
| *F16J 15/34* | (2006.01) |

(52) U.S. Cl.
CPC ......... *F04D 29/061* (2013.01); *F04D 29/126* (2013.01); *F16J 15/3404* (2013.01)

(58) Field of Classification Search
CPC .... F04D 29/061; F04D 29/126; F16J 15/3404
USPC .......................................... 415/111
See application file for complete search history.

(56) References Cited

U.S. PATENT DOCUMENTS

| | | | | |
|---|---|---|---|---|
| 3,762,724 | A | * 10/1973 | Porter | F16J 15/3404 277/353 |
| 4,202,654 | A | 5/1980 | Marlow | |
| 5,249,812 | A | * 10/1993 | Volden | F16J 15/162 277/361 |
| 5,322,428 | A | 6/1994 | Hansen | |
| 5,722,671 | A | * 3/1998 | Nosowicz | F16J 15/3404 277/408 |
| 6,422,822 | B1 | 7/2002 | Holmes | |
| 7,665,975 | B2 | 2/2010 | Parmeter | |
| 8,414,257 | B2 | 4/2013 | Scott | |
| 8,540,478 | B2 | 9/2013 | Teragaki | |
| 2003/0202875 | A1* | 10/2003 | Pessin | F04D 29/061 415/1 |
| 2008/0047756 | A1* | 2/2008 | Hooper | F16J 15/3404 175/107 |

FOREIGN PATENT DOCUMENTS

CN  202326370  7/2012

* cited by examiner

*Primary Examiner* — Aaron R Eastman
(74) *Attorney, Agent, or Firm* — M. Susan Spiering; Ferrell's PLLC

(57) ABSTRACT

Disclosed is a pump which comprises a mechanical seal lubricated by supplying lubricant from an external oiler. When there is no fluid flowing through the pump and the pump is in operation, the temperature of the mechanical seal rises. The lubricant from the oiler is supplied to the center of the mechanical seal through entry lines, and serves to maintain temperature within the pump and seal, while also avoiding failure of the seal. The lubricant keeps the mechanical seal cool and lubricated at all times.

7 Claims, 6 Drawing Sheets

MECHANICAL SEAL LUBRICATION SYSTEM

CROSS REFERENCE TO RELATED APPLICATION(S)

This is a non-provisional patent application based on U.S. Provisional Patent Application Ser. No. 62/043,625 previously titled "Lubrication of Mechanical Seal", filed on Aug. 29, 2014, the priority of which is hereby claimed and the disclosure of which is incorporated herein by reference in its entirety.

BACKGROUND

Field of the Invention

The present invention generally relates to a method to prevent the rupturing of a mechanical seal used in centrifugal pumps. More particularly, the present invention relates to a lubrication mechanism for the mechanical seal.

Description of the Related Art

Centrifugal pumps are the most preferred hydrodynamic pumps used in domestic and industrial applications. The centrifugal pumps are provided with mechanical seals that are protective devices specially engineered to be used in the centrifugal pump. The primary function of a mechanical seal is to prevent liquid under pressure from leaking out of the pump and to prevent air from drawing into the pump. The mechanical seal is also used to reduce friction and power losses of the shaft, increase the flexibility to negate the shaft deflections, and to improve the overall reliability of the pump. Hence, the mechanical seal needs to be lubricated or replaced at regular time intervals to prevent it from rupturing.

In current industrial practice, the lubrication process of the centrifugal pump is operated without the use of control systems and thus there is no control on the fluctuating temperature of the lubricant. In some cases when there is no fluid flowing through the pump due to human or technical errors, the pump has to be shut down as it may hamper the life of the pump. The mechanical seal on the centrifugal pump has two metal surfaces in contact with each other. In such conditions, absence of a coolant, such as oil field fluids, or oil as used ordinarily in pump applications, causes the temperature of the mechanical seal to rise. This may cause the mechanical seal to crack; thereby damaging the mechanical seal.

The rise in temperature of the mechanical seal depends on the type of fluid running through the pump, the velocity with which the fluid is running and the impurities it carries along with it among other factors. If the fluid is more concentrated with slurry than water, the temperature of the pump and the mechanical seal rises drastically. Generally, the temperature of the mechanical seal always falls in the range of about 250-300 degree Fahrenheit.

Great Britain Patent No. 1,600,673 discloses a mechanism relating to lubrication of a mechanical seal. Oil housing is placed between a drive unit and a pump unit of a submersible pump. The oil housing contains various chambers filled with oil, which is used for lubricating and cooling the bearings and seal of the pump. However, the invention fails to mention the cooling mechanism of the oil housing. During the operation of the pump if the oil gets heated up, its purpose to be used as a coolant is defeated. Another Great Britain Patent No. 1,241,944 discloses an oil reservoir for lubrication of a mechanical seal used in rotary vacuum pumps.

Another example of an arrangement of the oil chamber around the mechanical seal is shown in Japanese Patent No. 2,014,051,938. The mechanical seal has a seal chamber filled with lubricating oil and is installed in the inner side of the pump. If due to human or technical error, fluid stops flowing through the pump, the seal chamber might get heated up as it is placed on the inner side of the pump. This increases the possibility of rupturing of the seal when the pump is in operation and there is no flow of fluid through the pump.

Chinese Patent No. 202,326,370 discloses an air layer to protect the mechanical seal submersible pumps. Chinese Patent No. 102,032,168 discloses a mechanical sealing device for a pump which effectively prevents the spring from being corroded, and reduces the abrasion of the sealing surfaces.

In another example a U.S. Pat. No. 8,414,257 discloses an improved self-priming centrifugal pump for improving the efficiency of the pump. U.S. Pat. No. 5,322,428 discloses a gear transfer pump with lubrication and sealing of the driveshaft and idler pin and U.S. Pat. No. 8,540,478 discloses architecture of a multi stage high pressure pump. U.S. Pat. No. 4,202,654 discloses a wear resistant self-lubricating centrifugal pump and U.S. Pat. No. 6,422,822 discloses a pressurized seal for submersible pumps. A lubricated shaft seal is disclosed in U.S. Pat. No. 3,762,724 and an improved seal section located between the motor and the pump for equalizing pressure of motor lubricant contained in the motor is disclosed in U.S. Pat. No. 7,665,975.

The above prior art systems and methods suffer from one of or more of disadvantages, including irregular lubricant supply to the pump and the mechanical seal, rupturing of the seal over short periods of time, human and technical errors, and so forth.

The art is replete with patents regarding pumps and improvements thereto. However minimal to no information has been found regarding centrifugal pumps and extending their shelf life by maintaining oil in their system at all times. In light of the foregoing discussion, there exists a need for an innovative lubrication mechanism of the mechanical seal used in centrifugal pumps which maintains the life of the pump by keeping fluids flowing there through when the pump is suddenly and unexpectedly having a loss of fluid flow.

SUMMARY

Disclosed herein is a lubrication mechanism for the mechanical seal used in centrifugal pumps which maintains and extends the life of the pump by keeping fluids flowing there through when the pump is suddenly and unexpectedly shut off.

An object of the present invention is to provide a lubrication mechanism for a mechanical seal used in a pump.

Another object of the present invention is to avoid the rupturing of the mechanical seal due to human or technical errors by having a back-up lubricant source.

The mechanical seal is placed and attached along an imaginary axis of the shaft sleeve, such that both the shaft sleeve and the mechanical seal are concentric with respect to each other. A seal plate is placed on the outer periphery of the shaft sleeve, such that the seal plate and the shaft sleeve are concentric with respect to each other. An external oiler is provided to hold the lubricant which is passed to the center of the mechanical seal through a vent. An embodiment of the present invention provides a plurality of fins having grooves. The plurality of fins is useful for maintaining the temperature of the mechanical seal and that of the lubricant present at the center of the mechanical seal.

In operation, the pump pumps fluids such as sand, acid, gel, and the like down into oil wells. The fluids act to also lubricate the pump while it is running. The inventive device holding oil acts as a backup system so as when the pump unexpectedly experiences loss of suction fluid.

BRIEF DESCRIPTION OF DRAWINGS

The features of the present invention, which are believed to be novel, are set forth with particularity in the appended claims. Embodiments of the present invention will hereinafter be described in conjunction with the appended drawings provided to illustrate and not to limit the scope of the claims, wherein like designations denote like elements, and in which:

DETAILED DESCRIPTION OF EMBODIMENTS

As used in the specification and claims, the singular forms "a", "an" and "the" include plural references unless the context clearly dictates otherwise. For example, the term "an article" may include a plurality of articles unless the context clearly dictates otherwise.

Those with ordinary skill in the art will appreciate that the elements in the Figures are illustrated for simplicity and clarity and are not necessarily drawn to scale. For example, the dimensions of some of the elements in the Figures may be exaggerated, relative to other elements, in order to improve the understanding of the present invention.

There may be additional components described in the foregoing application that are not depicted on one of the described drawings. In the event such a component is described, but not depicted in a drawing, the absence of such a drawing should not be considered as an omission of such design from the specification.

Before describing the present invention in detail, it should be observed that the present invention utilizes a combination of system components which constitutes a modification in the lubrication mechanism of a mechanical seal used in centrifugal pumps. Accordingly, the components and the method steps have been represented, showing only specific details that are pertinent for an understanding of the present invention so as not to obscure the disclosure with details that will be readily apparent to those with ordinary skill in the art having the benefit of the description herein.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

A system 100 for lubricating a mechanical seal 102 used in a pump 104 is shown in FIGS. 1-8. The system 100 is configured to maintain the temperature of the mechanical seal 102 and that of the overall pump at normal operating temperature generally ambient for many purposes. The invention is directed for use on centrifugal pumps, but can also be used with any other type of pumps known in the art which require lubrication for their operation and maintenance. The mechanical seal is provided with grooves so that air is circulated within the mechanical seal and the temperature of the mechanical seal is maintained at its normal operating temperature.

Figure 1:
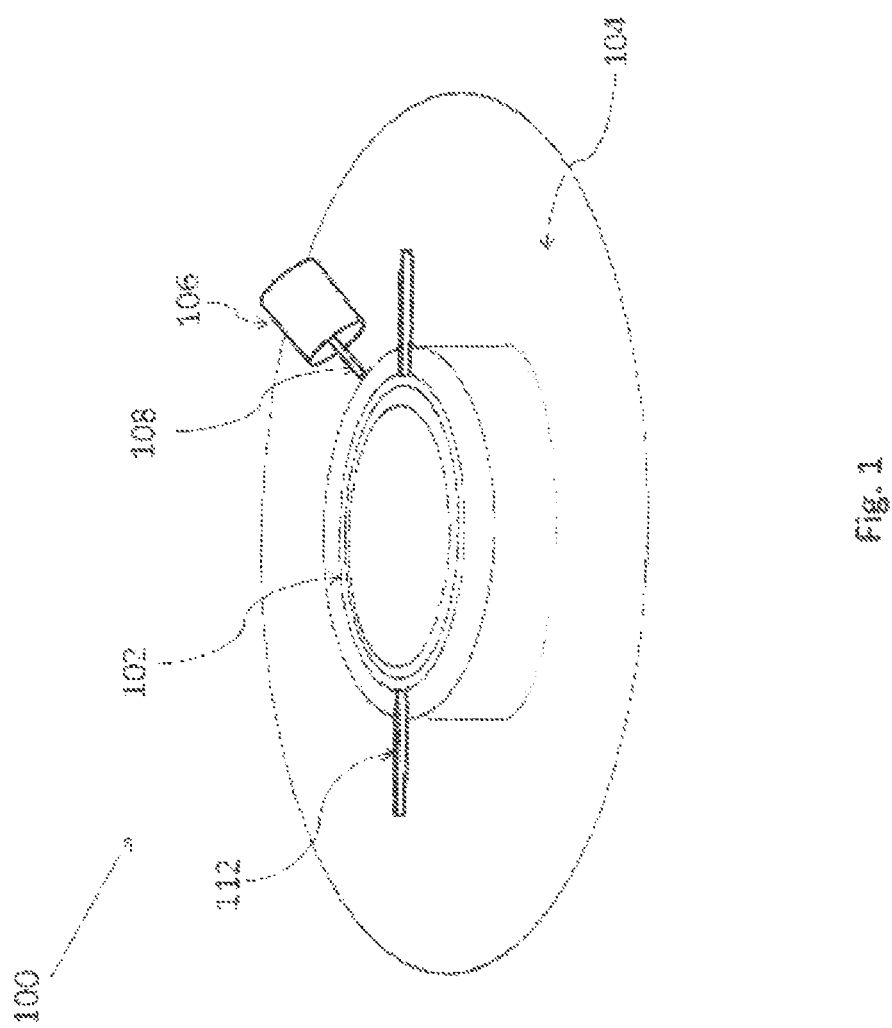
FIG. 1 shows an exploded perspective view of a mechanical seal.
Figure 2:
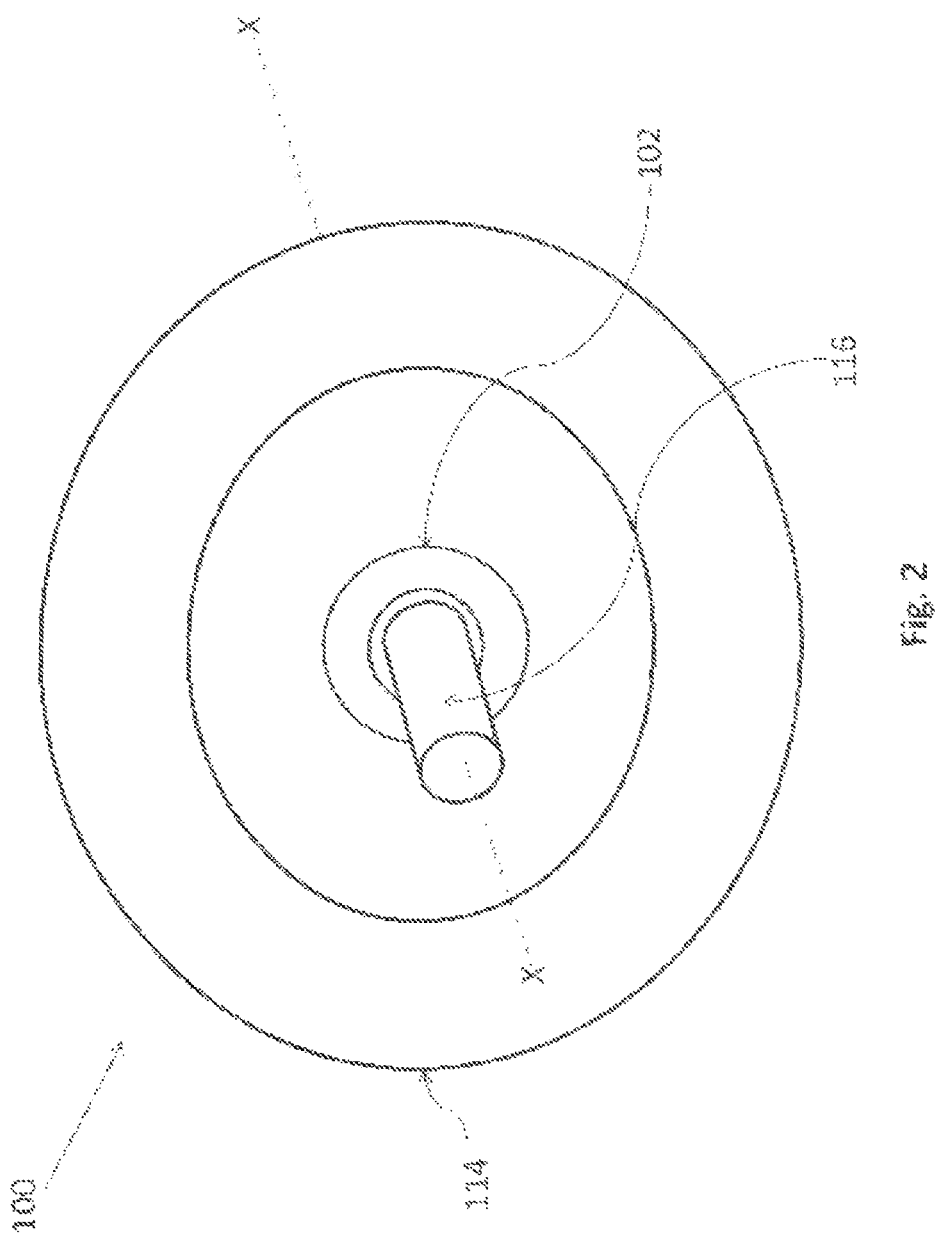
FIG. 2 shows a side view of the assembly of the mechanical seal used in the pump.
Figure 3:
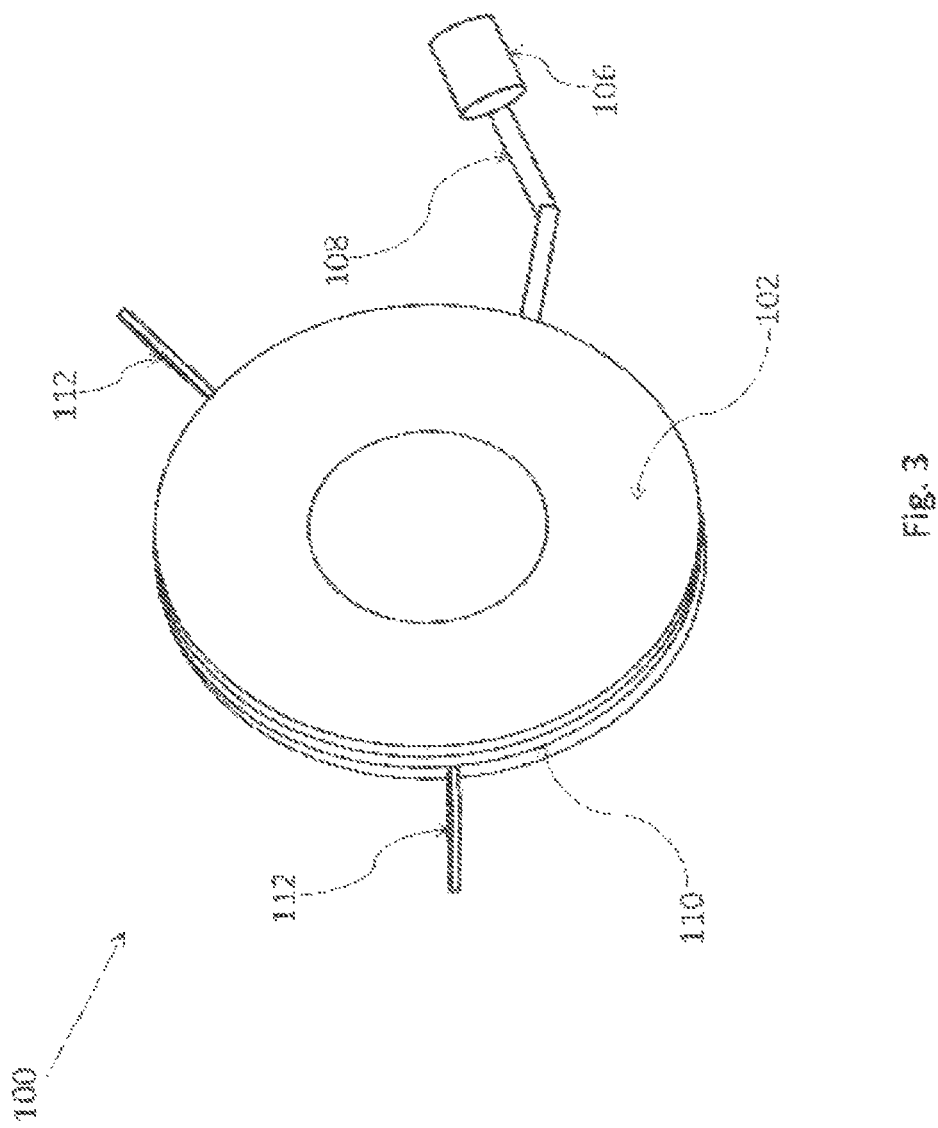
FIG. 3 shows a perspective view of the mechanical seal along with a lubrication system.

The system 100 comprises the mechanical seal 102, the pump 104, an oiler 106, an oil entry line 108, a plurality of fins 110, a breather tube 112, a seal plate 114, and a shaft sleeve 116 as shown in FIGS. 1, 2 and 3, according to an illustrative embodiment of the disclosure. An exploded perspective view of the system 100 comprising the mechanical seal 102 attached on the pump 104 is shown in FIG. 1. The oiler 106, (also known as oil reservoir, or fill) which includes the entry line 108, and a drain hole (not shown) is mounted on the left or right side of the mechanical seal 102 such that it is visible during the operation of the pump 104. The entry line 108 is configured to guide the lubricant flow towards the center of the mechanical seal 102. The lubricant coming out of the oiler 106 cools the mechanical seal 102 and other components of the pump 104 as needed. The pump 104 is generally running with fluids constantly flowing through them. When the pump 104 unexpectedly shuts down and fluid flow immediately halts, the gravity fed lubricant from oiler 106 is then present in the system as a backup lubricant to keep the pump lubricated and cool and avoid mechanical seal failure.

The breather 112, oiler, oil reserve, or fill hole, and drain hole can vary in depth and size based on the system 100 employed, but for a 6 inch assembly, suitable dimensions can be about ⅛ inch depth into the system 100, and be about or less than an inch, preferable about 0.75 inch wide, A perspective view of the system 100 comprising the mechanical seal 102 used in the pump 104 is shown in FIG. 2. The shaft sleeve 116 and the seal plate 114 are concentrically placed about an imaginary axis X-X. The mechanical seal 102 is placed at the center of the seal plate 114 passing through the shaft sleeve 116. The mechanical seal 102 and the shaft sleeve 116 are also concentrically placed about the imaginary axis X-X.

The pump 104 is configured to handle slurry containing sand, acid and gel; however the scope and handling capacity of the pump 104 should not be limited to these systems or impurities only. In an example, the lubricant present in the oiler 106 is a barrier fluid GT sold by the company Royal Purple. The barrier fluid GT has been found to have excellent heat transfer properties, low temperature fluidity, low flash point and is compatible with most mechanical seals. The viscosity index of barrier fluid GT varies across various grades from 123-135. It should be appreciated that in another example, mineral oil, or other oils, can also be used for lubrication.

The volume of the oiler 106, according to an embodiment of the present invention for a six inch system 100, is about six and a half ounces, but four ounces is sufficient for the lubrication process. It should be appreciated that the volume of the oiler may also vary between four and seven ounces, with five and half to six and a half ounces preferred, and most preferred being about six and a half ounces. The seal 102 comprises a plurality of vanes (not shown in figures) to ensure that the lubricant inside the oiler 106, and also within the pump, is maintained at normal operating temperature (about 180 degree Fahrenheit-225 degree Fahrenheit) at all times. The lubricant is gravity fed to the center of the mechanical seal 102. The mechanical seal 102 is kept lubricated at all times even when no fluid is running through the pump 104, which can be due to human or technical error. A plurality of snap rings (not shown) is attached to the oiler 106 to avoid leakage of the lubricant. The breather tube 132 used with the oiler 106 is a breather vent according to the embodiment of the present invention. The oiler 106 is present such that it is visible to a user during the operation of the pump 104 at all times.

The plurality of fins 110 or grooves are fixedly attached or built into the mechanical seal 102 as shown in FIG. 3. The plurality of fins 110 is configured to maintain the temperature of the mechanical seal 102 at normal operating temperature. The grooves allows the atmospheric air to travel through the mechanical seal 102, thereby maintaining the temperature of the lubricant present at the center of the mechanical seal 102 at normal operating temperature. Both the mechanical seal 102 and lubricant present at the center of the mechanical seal 102 are maintained at normal operating temperature. The plurality of fins 110 are made of aluminum as aluminum dispenses heat faster than steel. However, it is understood that any metal which dispenses heat and has the integrity needed for the pump may be employed. The plurality of fins 110 keeps the temperature lubricant in the oiler 106 lower than the temperature of the lubricant at the center of the mechanical seal 102. This ensures that when the fluid flow stops unexpectedly, the pump 104 is lubricated and is not overheated as the cooler lubricant from the oiler 106, replaces the hotter lubricant at the center of the mechanical seal 102.

Figure 4:
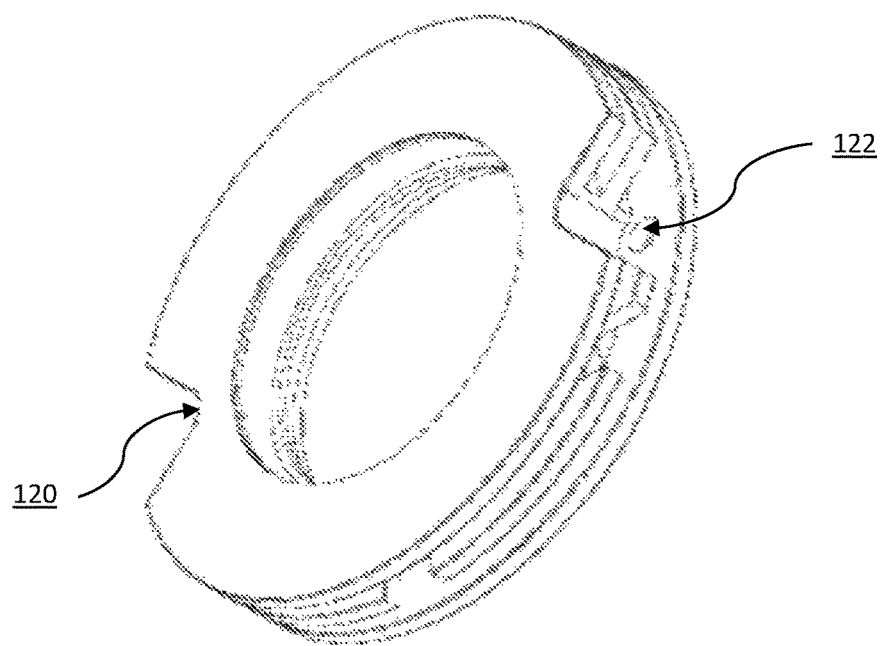
FIG. 4 shows a modified fin design having a notch and hole on the system.
Figure 5:
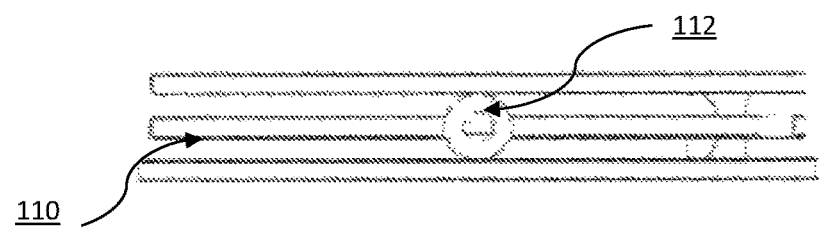
FIG. 5 shows a view of the modified notch and fin assembly with a breather hole exposed.
Figure 6:
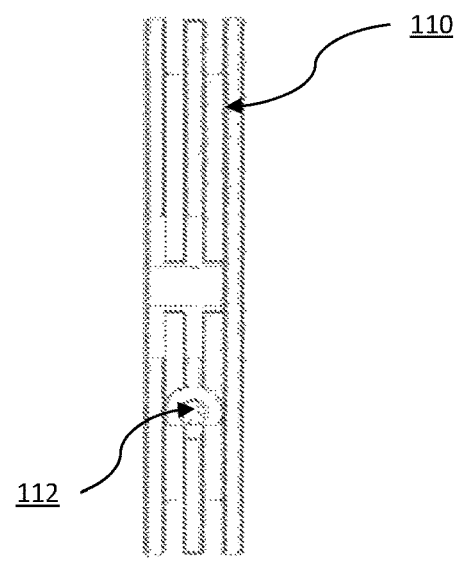
FIG. 6 shows an alternate side view of FIG. 5.
Figure 7:
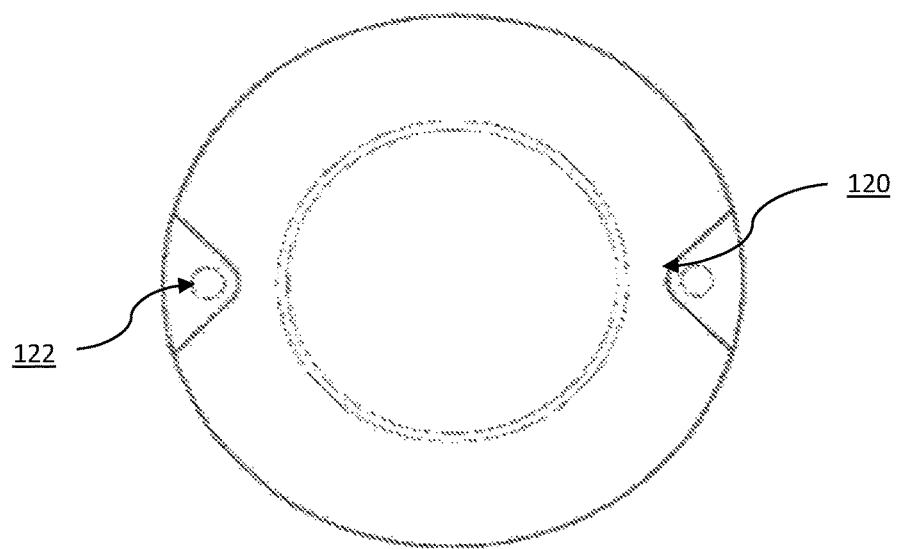
FIG. 7 shows a frontal or top view of the notched assembly.
Figure 8:
FIG. 8 shows a side view of the assembly having differing length fins.

FIG. 4 and FIG. 7 illustrate a modified fin design with a notch 120 and bolt hole 122 on two (2) sides of the assembly. These notches 120 and bolt holes 122 were found to make it easier to install and secure the system onto a pump. FIG. 8 illustrates the alternate fin design that has alternating length of fins along the assembly. For the avoidance of doubt, both continuous and alternating fin design dissipate heat. As an option, the lengths can vary from about 4.0 inches to about 6 inches with a preference for 4.25 to about 5.25 inches, and more preferred can be spaced apart from each other about 0.25 inch apart. The lengths are variable and for about a 6 inch assembly having non-continuous fins, can be about 4.25 inches, 4.50 inches, 4.75 inch, 5.25 inches as somewhat shown in FIG. 4 and. FIG. 5. The spacing between fins can vary from about a 1/32 inch to about 0.50 inch depending on the total width of the assembly, with a preference for about a width separation of about 1/4 inch to about 1/2 inch, and most preferred about 1/4 inch. The fins can all be the same length or can be variable as described. FIGS. 5 and 6 show the breather tube 112 and fins 110 exposed. FIG. 7 illustrates a top view of the notched assembly. The width of an individual fin can range from about 1/32 inch to about 1/4 inch, with a preference for about a 1/4 inch. It is understood by those skilled in the art that these parameters are merely starting points arid will be dependent upon the pump utilized, i.e., its size or dimensions, and its pumping capabilities.

The notch 120 can be at about a 90 degree angle or whatever is desired for ease in installation. The bolt hole 122 can be whatever size is desired by the user but preferred is a range of about 0.40-0.50 inch diameter, preferably 0.40-0.47 inches and most preferred being about 0.45 inch diameter; almost any size hole is acceptable provided a matching bolt size is available to be used for securing onto the pump.

It should be appreciated that the application of the lubrication mechanism of the mechanical seal 102 according the embodiment of the present invention should not be limited to pumps only. The lubrication mechanism can be applied on any equipment that makes the use of the mechanical seal 102. Also, since the invention is directed towards the mechanical seal along with its grooved members and discloses that the lubricant is passed through an entry line (which can be placed in an oiler as shown herein, or an external tank unit with an entry line as shown), other pump parts are not described. Those skilled in the art will appreciate that the pump, this inventive device is used on will contain other parts such as a chamber, a seal assembly having a block, seal face, compression ring(s) and drive pins, collar and spring members therefor. It should also be appreciated that the placement of all the embodiments in the current disclosure can be modified and changed depending on the size of the pump so that air temperature can be maintained.

The present invention has been described herein with reference to a particular embodiment for a particular application. Although selected embodiments have been illustrated and described in detail, it may be understood that various substitutions and alterations are possible. Those having ordinary skill in the art and access to the present teachings may recognize additional various substitutions and alterations are also possible without departing from the spirit and scope of the present invention, and as defined by the following claim.

What is claimed is:

1. A lubrication system attachable to a pump, the lubrication system comprising:
a shaft sleeve rotatable about an imaginary axis, wherein the shaft sleeve is configured to house a shaft of the pump and wherein said shaft sleeve is exterior to the pump;
a mechanical seal configured to be concentrically mounted around the shaft sleeve about the imaginary axis, wherein the mechanical seal is mounted outside the pump, and wherein a plurality of fins are provided on the mechanical seal; and
an oiler attached to the mechanical seal, wherein the oiler contains a lubricant and has an entry line for guiding flow of the lubricant towards a center of the mechanical seal,
wherein the plurality of fins are configured to guide atmospheric air through the mechanical seal, thereby maintaining the mechanical seal and the lubricant at the center of the mechanical seal at predetermined temperatures.

2. The lubrication system according to claim 1, wherein the oiler contains a volume of four to seven ounces.

3. The lubrication system according to claim 1, wherein the oiler is attached to the mechanical seal such that the oiler is visible to a user at all times during the operation of the pump.

4. The lubrication system according to claim 1, wherein the plurality of fins comprises continuous fins.

5. The lubrication system according to claim 1, wherein the plurality of fins comprises alternating size of fins ranging from four to seven inches in length.

6. The lubrication system according to claim 1, wherein the pump is a centrifugal pump.

7. The lubrication system according to claim 1, wherein the mechanical seal has notches for ease in installation.

\* \* \* \* \*